(12) United States Patent  
Watanabe (10) Patent No.: US 7,536,910 B2  
(45) Date of Patent: May 26, 2009

(54) VIBRATION ACCELERATION SENSOR

(75) Inventor: Jun Watanabe, Chigasaki (JP)

(73) Assignee: Epson Toyocom Corporation (JP)

( * ) Notice: Subject to any disclaimer, the term of this patent is extended or adjusted under 35 U.S.C. 154(b) by 44 days.

(21) Appl. No.: 11/778,136

(22) Filed: Jul. 16, 2007

(65) Prior Publication Data

US 2008/0016963 A1    Jan. 24, 2008

(30) Foreign Application Priority Data

| Jul. 20, 2006 | (JP) | ............................ 2006-198750 |
| Sep. 26, 2006 | (JP) | ............................ 2006-261214 |
| Mar. 20, 2007 | (JP) | ............................ 2007-072885 |

(51) Int. Cl.
*G01P 9/04* (2006.01)
*G01P 15/00* (2006.01)

(52) U.S. Cl. ............... 73/504.12; 73/504.15; 73/504.16

(58) Field of Classification Search ............. 73/504.16, 73/504.12, 504.14, 504.15, 514.16, 514.29; 310/370

See application file for complete search history.

(56) References Cited

U.S. PATENT DOCUMENTS 4,930,351 A * 6/1990 Macy et al. ............... 73/504.04
6,396,144 B1 * 5/2002 Koyama ...................... 257/728
6,462,530 B1 * 10/2002 Layton ..................... 324/76.49
6,598,476 B2 * 7/2003 Terada et al. ............. 73/504.16
6,708,564 B2 * 3/2004 Ishikawa et al. .............. 73/493
6,796,177 B2 * 9/2004 Mori ....................... 73/504.02

FOREIGN PATENT DOCUMENTS

JP    H09-257830    10/1997

* cited by examiner

*Primary Examiner*—Helen C. Kwok
(74) *Attorney, Agent, or Firm*—Harness, Dickey & Pierce, P.L.C.

(57) ABSTRACT

An acceleration sensor, including: an oscillator unit for outputting an oscillator signal, the oscillator unit including a first piezoelectric vibrating reed having a vibrating arm that performs bending vibration, as well as an oscillator circuit for oscillating the first piezoelectric vibrating reed; a phase shifting unit for shifting and outputting a given phase angle of an output signal of the oscillator unit; a phase shift circuit unit provided with a second piezoelectric vibrating reed having a vibrating arm that performs bending vibration, arranged at an output side of the phase shifting unit; a multiplier for multiplying the output signal of the phase shift circuit unit by the output signal of the oscillator circuit; and a phase shift modification output unit which receives an output from the multiplier and outputs a value corresponding to a change in a phase shift angle of an input-output signal of the phase shift circuit unit; a resonant frequency of the second piezoelectric vibrating reed being equal to a frequency of the output signal of the oscillator unit, in a state where no acceleration is applied.

8 Claims, 8 Drawing Sheets

VIBRATION ACCELERATION SENSOR

BACKGROUND

The entire disclosure of Japanese Patent Application Nos: 2006-198750, filed Jul. 20, 2006 and 2006-261214, filed Sep. 26, 2006 are expressly incorporated by reference herein.

BACKGROUND

1. Technical Field

The present invention relates to an acceleration sensor, particularly to a vibration acceleration sensor, which detects a magnitude of acceleration by utilizing the change of frequencies caused by acceleration.

2. Related Art

Some acceleration sensors utilize the resonance phenomenon of vibrating body. These vibration acceleration sensors detect resonant frequency of the vibrating body, so as to perceive the magnitude of acceleration. Thus, it is easy to digitalize a detector circuit as well as to make the circuit smaller. In JP-A-9-257830, a vibration acceleration sensor is suggested, in which a vibrating body is arranged having a thin contact unit between a support and a mass. The acceleration sensor recited in JP-A-9-257830 can be manufactured with a silicon substrate, utilizing micromachining techniques.

However, since the above-described acceleration sensor contains semiconductors, a special external force is required in order to excite the vibrating body, and the frequency-temperature characteristic of the sensor is poor, requiring a separate units such as a circuit that compensate temperatures. Moreover, such acceleration sensor does not detect acceleration unless a stress based on a certain degree of acceleration is imposed on the sensor, making it difficult for the sensor to have high sensitivity.

SUMMARY

An advantage of the invention is to resolve the drawback of the known techniques, so as to improve the sensitivity of the sensor.

Another advantage of the invention is to improve its temperature characteristic.

Figure 6:
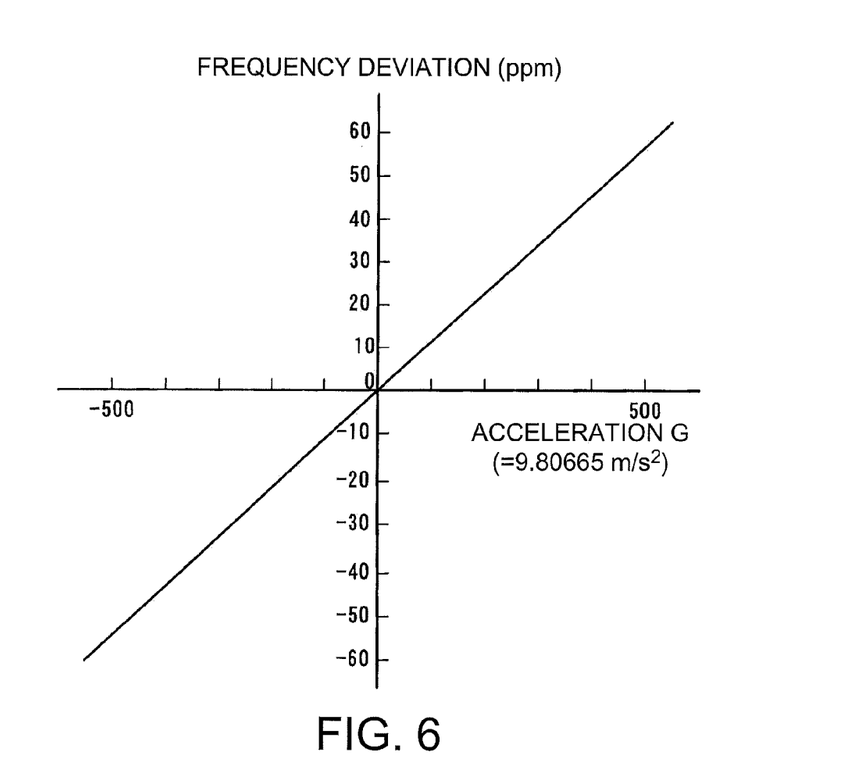
FIG. 6 illustrates a relationship between acceleration and a resonant frequency of a piezoelectric vibrating reed according to one embodiment of the invention.

The inventors conducted a keen research and experiments in order to obtain an acceleration sensor with high sensitivity. They found out that when acceleration is applied in the longitudinal direction of a tuning fork vibrating reed formed with crystal, the resonant frequency thereof changes in proportion to the acceleration, as shown in FIG. 6. Referring now to FIG. 6, the horizontal axis represents the acceleration expressed by unit of a gravitational acceleration G (=9.80665 m/s$^2$), and the vertical axis represents a frequency deviation ppm of the resonant frequency at the time of acceleration that is applied to the axis direction of the tuning fork vibrating reed. Here, the frequency deviation is a change in the resonant frequency compared to the value when acceleration is not applied, which is 40 kHz. A positive (+) acceleration indicates a state where acceleration is directed from the base to the front edge of the vibrating arm of the tuning fork vibrating reed. A negative (−) acceleration indicates a state where acceleration is directed from the front edge to the base of the vibrating arm. The present invention is based on the above knowledge.

According to a first aspect of the invention, an acceleration sensor includes: an oscillator unit for outputting an oscillator signal, the oscillator unit including a first piezoelectric vibrating reed having a vibrating arm that performs bending vibration, as well as an oscillator circuit for oscillating the first piezoelectric vibrating reed; a phase shifting unit for shifting and outputting a given phase angle of an output signal of the oscillator unit; a phase shift circuit unit provided with a second piezoelectric vibrating reed having a vibrating arm that performs bending vibration, arranged at an output side of the phase shifting unit; a multiplier for multiplying the output signal of the phase shift circuit unit by the output signal of the oscillator circuit; and a phase shift modification output unit which receives an output from the multiplier and outputs a value corresponding to a change in a phase shift angle of an input-output signal of the phase shift circuit unit; a resonant frequency of the second piezoelectric vibrating reed being equal to a frequency of the output signal of the oscillator unit, in a state where no acceleration is applied.

In the above aspect of the invention, the resonant frequency of the second piezoelectric vibrating reed which forms the phase shift circuit unit, in the state without acceleration, is set to be equal to a frequency of the output signal of the oscillator unit without acceleration. Therefore, if the acceleration is not applied, the phase difference between the output signal of the oscillator unit and the output signal of the phase shift circuit unit equals the amount of the phase shift of the phase shifting unit. However, if the acceleration is applied, the resonant frequency changes as described above, and the oscillation frequency of the output signal of the oscillator unit becomes different from the resonant frequency of the second piezoelectric vibrating reed. Thus, the phase difference between the output signal of the oscillator unit and the output signal of the phase shift circuit unit does not equal the amount of the phase shift of the phase shifting unit. Consequently, the magnitude of acceleration applied is calculated by detecting the deviation of a phase difference deviating from the amount of phase shift of the phase shifting unit. Moreover, since the piezoelectric vibrating reed is used as a vibrating body, an excitation is easy and the change of stress caused by a small magnitude of acceleration changes the resonant frequency of the piezoelectric vibrating reed. The sensitivity is thereby improved. Further, the piezoelectric material forming the piezoelectric vibrating reed generally excels in the frequency-temperature characteristic compared to semiconductors, thereby improving the temperature characteristic. Still further, since the phase difference between the output signal of the oscillator unit and the output signal of the phase shift circuit unit is detected, the detector circuit is made simpler and smaller.

In this case, the first piezoelectric vibrating reed and the second piezoelectric vibrating reed may be arranged so that an axis direction of the vibrating arm of the first piezoelectric vibrating reed and an axis direction of the vibrating arm of the second piezoelectric vibrating reed are opposite from each other. This makes the phase change in the phase shift circuit unit twice as much, compared to a change occurring only in the output signal of the oscillator unit.

In this case, a frequency-phase shift characteristic of the phase shift circuit unit may be point symmetric with respect to the resonant frequency of the second piezoelectric vibrating reed without acceleration. The characteristic, expressed with the phase shift amount in the phase shift circuit unit against the applied acceleration, therefore becomes point symmetric with respect to acceleration 0 (m/s$^2$). The acceleration is thereby detected in a simple circuitry.

In this case, the first and the second piezoelectric vibrating reeds may be tuning fork vibrating reeds formed with a piezoelectric material. Tuning fork vibrating reeds are widely used for clocks and can be manufactured at a low cost. Moreover, double-ended tuning fork vibrating reeds formed with piezoelectric material may be used for the first and the second piezoelectric vibrating reeds. If the piezoelectric vibrating reeds are the double-ended tuning fork vibrating reeds, the acceleration sensor becomes more sensitive and provides higher performance.

The above structure may further include: a package accommodating the first tuning fork piezoelectric vibrating reed and an integrated circuit, both forming the oscillator circuit, and the second tuning fork piezoelectric vibrating reed included in a phase-shift circuit unit; and a lid sealing the package in an air tight manner.

Such structure according to the above aspect of the invention, the operating environment of the turning fork piezoelectric vibrating reed is stabilized during the acceleration detection, if the vibrating reed is sealed in a air tight manner. This way, the vibration becomes stable, and thereby the stable acceleration detection is performed.

In this case, the package is formed having two cavities stacked one on top of the other, each cavity including an interconnection substrate, one cavity accommodating the first and the second tuning fork piezoelectric vibrating reeds, and the other cavity accommodating the integrated circuit.

With this structure, the space for packaging the electronic parts is made smaller, by providing two cavities and accommodating the parts in the vertical two-tier cavities.

Moreover, the package may be formed having two cavities stacked one on top of the other, having a shared interconnection substrate therebetween, one cavity accommodating the first and the second tuning fork piezoelectric vibrating reeds, and the other cavity accommodating the integrated circuit.

With this structure according to the above aspect of the invention, the thickness of the package is reduced by installing the interconnection substrate 330 that are shared by the electric components accommodated in the two cavities, making the sensor's height shorter.

BRIEF DESCRIPTION OF THE DRAWINGS

The invention will be described with reference to the accompanying drawings, wherein like numbers reference like elements.

DESCRIPTION OF EXEMPLARY EMBODIMENTS

The desirable embodiments according to the above aspect of the present invention will now be described in detail in accordance with the attached drawings.

Sensor Device

Figure 4:
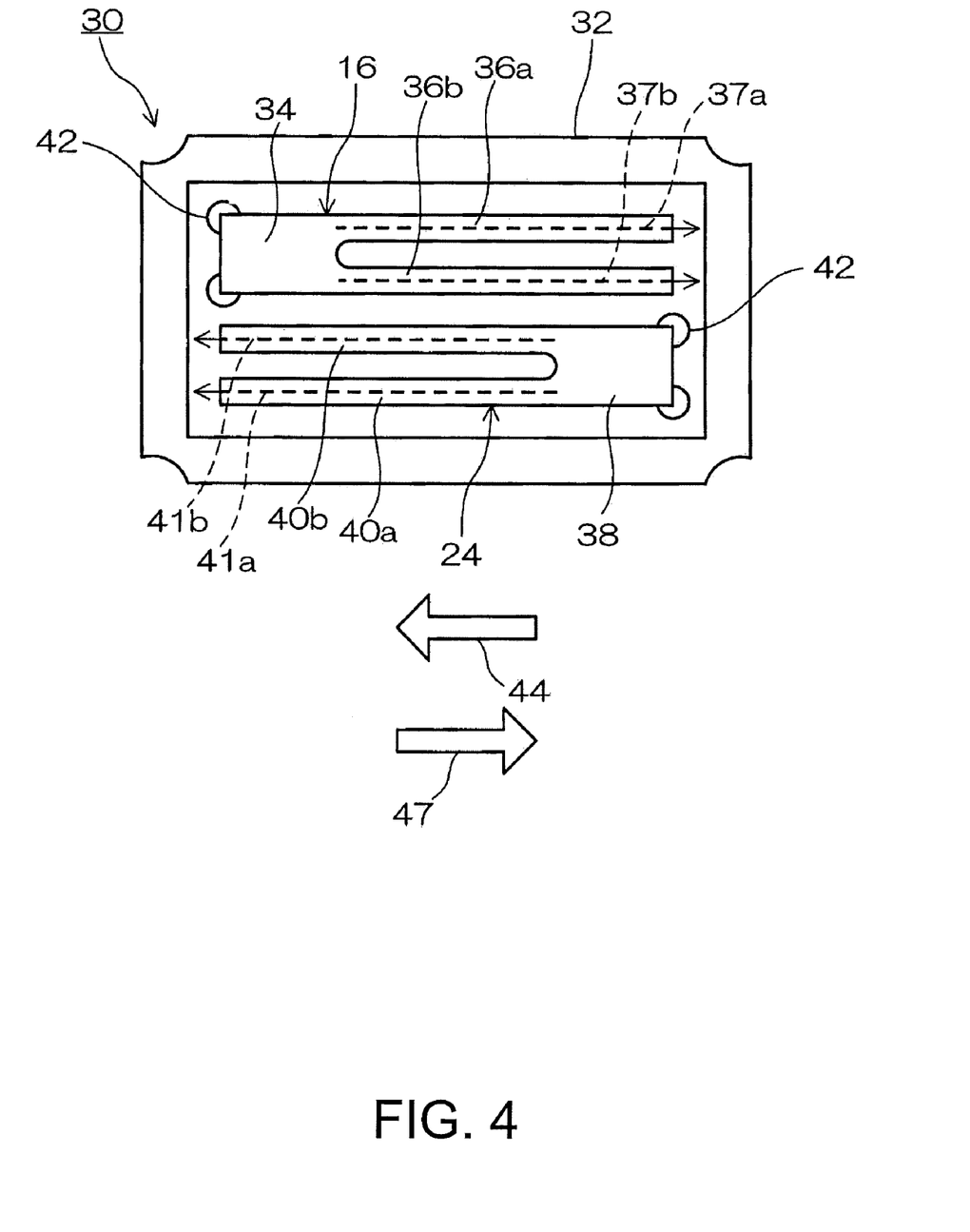
FIG. 4 is an explanatory drawing of an acceleration sensor according to one embodiment of the invention.

As shown in FIG. 4, a first piezoelectric vibrating reed 16 and a second piezoelectric vibrating reed 24 together form an acceleration sensor device 30. The acceleration sensor device 30 includes a package 32 in which the first piezoelectric vibrating reed 16 and the second piezoelectric vibrating reed 24 are packaged so as to be in parallel with each other. The body of the package 32 is formed into a box with ceramics, and un-illustrated cover is adhered on the top surface of the package 32, sealing the first piezoelectric vibrating reed 16 and the second piezoelectric vibrating reed 24 accommodated in the body in an air tight manner.

The first piezoelectric vibrating reed 16 includes a vibrating arms 36a and 36b that perform a bending vibration. Here, the vibrating arms 36a and 36b may also be referred to as "arms 36". The vibrating arms 36a and 36b are extended from a base 34 being in parallel to each other, and include an un-illustrated excitation electrode that is electrically coupled with an oscillation circuit 14. The second piezoelectric vibrating reed 24 includes a vibrating arms 40a and 40b that perform a bending vibration. The vibrating arms 40a and 40b are extended from a base 38 being in parallel to each other, and include an un-illustrated excitation electrode that is electrically coupled with an input or output terminal of a phase-shift circuit (filter circuit) unit 22. The first piezoelectric vibrating reed 16 and the second piezoelectric vibrating reed 24 are packaged on the same surface, such as a bottom surface of the package 32. In this embodiment, the first piezoelectric vibrating reed 16 and the second piezoelectric vibrating reed 24 are packaged in a manner to point the opposite direction. In other words, the base 34 of the first piezoelectric vibrating reed 16 which is adhered to the package is arranged on the left side of the vibrating arms 36a and 36b in FIG. 4. In this case, the base 38 of the second piezoelectric vibrating reed 24 which is adhered to the package is arranged at the right side of the vibrating arms 40a and 40b. The axes 37a and 37b of the vibrating arms 36a and 36b points to the direction opposite to the axes 41a and 41b of the vibrating arms 40a and 40b. Here, the vibrating arm points in the direction the vibration arm extends out from the base. Moreover, a pair of un-illustrated coupling terminals, formed on the bases 34 and 38 of the first piezoelectric vibrating reed 16 and the second piezoelectric vibrating reed 24, is fixed to an un-illustrated packaging terminal installed in the package 32.

If acceleration is applied to the acceleration sensor device 30 in the direction, for instance, from left to right as illustrated in an arrow 44 in FIG. 4, then the applied acceleration to the first piezoelectric vibrating reed 16 works from the base to the front edge of the vibrating arms 36, causing a tensile stress on the vibrating arms 36. Here, the direction of the acceleration applied is opposite to the axes direction 37a as well as to the axes direction 37b of the vibrating arms of the first piezoelectric vibrating reed 16. In other words, it is the same as that of the axis direction 41a and the axis direction 41b of the vibrating arms of the second piezoelectric vibrating reed 24. Consequently, when the first piezoelectric vibrating reed 16 is not accelerated, the resonant frequency thereof is biased to the frequency higher than the resonant frequency f0 without acceleration, thereby becoming f0+Δf. At the same time, the acceleration works in the second piezoelectric vibrating reed 24 from the base to the front edge of the vibrating arms 40, causing a compressive stress on the vibrating arms 40. The resonant frequency thereof is biased to the frequency lower than the resonant frequency f0 without acceleration, thereby becoming f0−Δf. In other words, the value of Δf corresponds to acceleration.

It is known that the resonant frequency f expressed by Formula 1 changes, in accordance with a change of the virtual elastic constant c caused by the tensile and compressive stresses.

$$f = K_0 \frac{W}{l^2} \sqrt{\frac{c}{\rho}} \quad \text{Formula 1}$$

Here, W is an arm width of the piezoelectric vibrating reed, l is a longitudinal length of the vibrating reed, ρ is a density, c is a virtual elastic constant, and $K_0$ is a constant.

Figure 1:
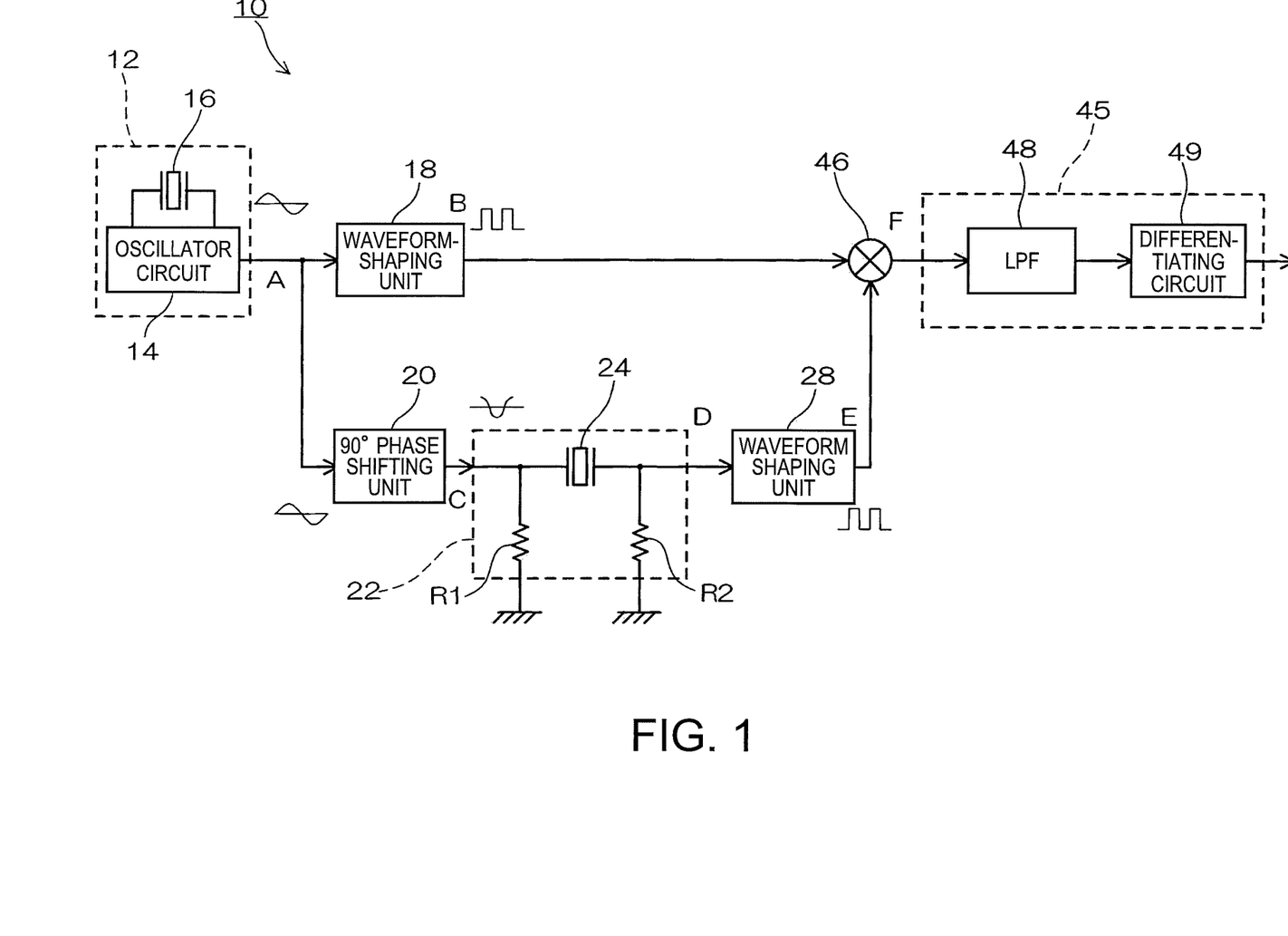
FIG. 1 is an explanatory drawing of an acceleration sensor according to one embodiment of the invention.

FIG. 1 is an explanatory drawing of an acceleration sensor according to one embodiment of the invention. An acceleration sensor 10 includes an oscillation unit 12. The oscillation unit 12 is formed including the oscillation circuit 14 and the first piezoelectric vibrating reed 16. The oscillation circuit 14 drives the first piezoelectric vibrating reed 16 and outputs oscillation a signal that includes a resonant frequency of the first piezoelectric vibrating reed 16. In this embodiment, the first piezoelectric vibrating reed 16 is formed with a crystal plate, which is a piezoelectric material, into a shape of a tuning fork. Other piezoelectric materials may include lithium tantalite ($LiTaO_3$), lithium niobate ($LiNbO_3$), and lithium tetraborate ($Li_2B_4O_7$).

A waveform-shaping unit 18 and a 90° phase shifting unit 20 receive the output signals of the oscillation unit 12. The waveform-shaping unit 18 shapes the waveform of the output signal of the oscillation unit 12, and outputs a square wave. The 90° phase shifting unit 20 receives some signals output from the oscillation unit 12, and changes (rotates) the phase of those signals by 90°, thereafter outputs the result.

The phase-shift circuit unit 22 is arranged at the output side of the 90° phase shifting unit 20. In this embodiment, this phase-shift circuit unit 22 is formed in the pi (π) model, with a pair of resistances R1 and R2, as well as with the second piezoelectric vibrating reed 24. In other words, an input terminal of the second piezoelectric vibrating reed 24 is coupled with an output terminal of the 90° phase shifting unit 20, and is grounded having the resistance R1 therebetween. Moreover, an output terminal of the second piezoelectric vibrating reed 24 is grounded having the resistance R2 therebetween, and is also coupled with a waveform-shaping unit 28 arranged at the output side of the phase-shift circuit unit 22.

Phase Shift Angle of Phase-Shift Circuit Unit Under Constant Acceleration

Figure 2:
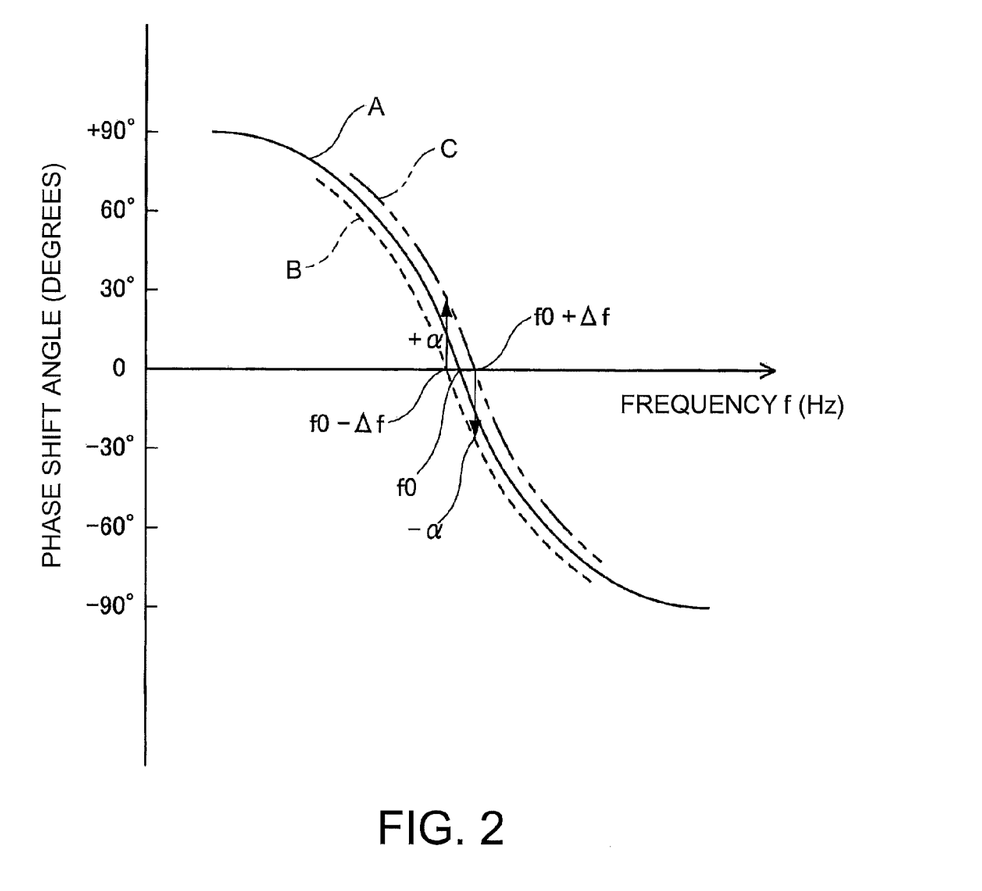
FIG. 2 is a graph exhibiting a frequency-phase shift characteristic of a phase-shift circuit unit according to one embodiment of the invention.

The second piezoelectric vibrating reed 24 is a tuning fork vibrating reed formed with a crystal plate, and the resonant frequency f0 in the state without acceleration equals the oscillation frequency of the oscillation unit 12 without acceleration. In this embodiment, the resonant frequency f0 of the second piezoelectric vibrating reed 24 without acceleration equals the resonant frequency of the first piezoelectric vibrating reed 16. FIG. 2 illustrates the frequency-phase shift characteristic, in other words, the characteristics of phase shift in relation to the frequency of the input signal of the phase-shift circuit unit 22 when the resonant frequency and the input signal frequency are stable. The horizontal axis of FIG. 2 represents a frequency f of the signal received by the phase-shift circuit unit 22, and the vertical axis represents the phase shift angle (phase change) of the output signal compared to that of the input signal, expressed in degrees (°).

In this embodiment, similar to the first piezoelectric vibrating reed 16, the second piezoelectric vibrating reed 24 is formed into a shape of a tuning fork with a crystal plate which is a piezoelectric material. Other piezoelectric materials may include lithium tantalite ($LiTaO_3$), lithium niobate ($LiNbO_3$), and lithium tetraborate ($Li_2B_4O_7$). In this case, it is desirable that the first piezoelectric vibrating reed 16 and the second piezoelectric vibrating reed 24 be manufactured with the homogeneous material, so that these two have no difference in the temperature characteristics.

Without acceleration, the phase-shift circuit unit 22 exhibits the characteristics represented by a curve A in FIG. 2. In other words, the frequency-phase shift characteristic of the phase-shift circuit unit 22 is point symmetric with respect to the resonant frequency f0 of the second piezoelectric vibrating reed 24 without acceleration. At this time, if a signal with a frequency of f0 is input into the phase-shift circuit unit 22, the phase shift angle becomes 0° and the phase of the output signal equals that of the input signal.

If the acceleration is applied in the direction of an arrow 47 as shown in FIG. 4, the phase-shift circuit unit 22 exhibits the characteristic expressed by a curve C in FIG. 2. That is to say, a curve B expressing the characteristic is shifted by +Δf. At this time, the acceleration in the direction of the arrow 47 in FIG. 4 causes the resonant frequency of the first piezoelectric vibrating reed 16 in the oscillation unit 12 to be biased to the frequency smaller than the resonant frequency f0. Therefore the frequency of the output signal of the oscillation unit 12 becomes f0−Δf. Consequently, the phase-shift circuit unit 22 receives a signal with a frequency f0−Δf, and the phase shift angle is then determined to α. Thus the phase of the output signal advances from that of the input signal. The phase shift angle changes twice as much when compared to the case where the frequency-phase shift characteristic of the phase-shift circuit unit 22 do not change under acceleration.

If the acceleration is applied in the direction of an arrow 44 as shown in FIG. 4, the phase-shift circuit unit 22 exhibits the characteristics represented by a curve B in FIG. 2. That is to say, the characteristics expressed by a curve B is shifted by −Δf. The acceleration in the direction of the arrow 44 in FIG. 4 causes the resonant frequency of the first piezoelectric vibrating reed 16 in the oscillation unit 12 to be biased to the frequency higher than the resonant frequency f0. Therefore the frequency of the output signal of the oscillation unit 12 becomes f0+Δf. Consequently, the phase-shift circuit unit 22 receives a signal with a frequency f0+Δf, and the phase shift angle is then determined to −α. Thus the phase of the output signal delays from that of the input signal. The phase shift angle changes twice as much when compared to the case where the frequency-phase shift characteristic of the phase-shift circuit unit 22 do not change under acceleration.

In a stable state where the magnitude of acceleration applied is constant, as described above, it is possible to obtain the change Δf of the resonant frequency corresponding to the phase shift angle α, thereby obtaining the acceleration corresponding to this change Δf. However, during the time the magnitude of acceleration is changing, the calculation of the acceleration is not carried out until the phase shift angle reaches α and becomes stable, resulting in a poor response of the sensor. Moreover, the acceleration cannot be calculated if the acceleration changes again before the phase shift angle stabilizes.

Phase Shift Angle of Piezoelectric Vibrating Reed During Acceleration Deviation

In an initial state, the resonant frequency of the second piezoelectric vibrating reed 24 and the input frequency of the phase-shift circuit unit 22 are both f0. The transition of the phase shift angle is expressed by a curve E in FIG. 3, where the resonant frequency of the second piezoelectric vibrating reed 24 changes to f0−Δf, and the frequency of the input signal changes to f0+Δf. In other words, the phase shift angle declines from 0° and saturates at −α.

In the initial state, the resonant frequency of the second piezoelectric vibrating reed 24 and the input frequency the phase-shift circuit unit 22 are both f0. The transition of the phase shift angle is expressed by a curve D in FIG. 3, when the resonant frequency of the second piezoelectric vibrating reed 24 changes to f0+Δf, and the frequency of the input signal changes to f0−Δf. In other words, the phase shift angle increases from 0° and saturates at α.

Figure 3:
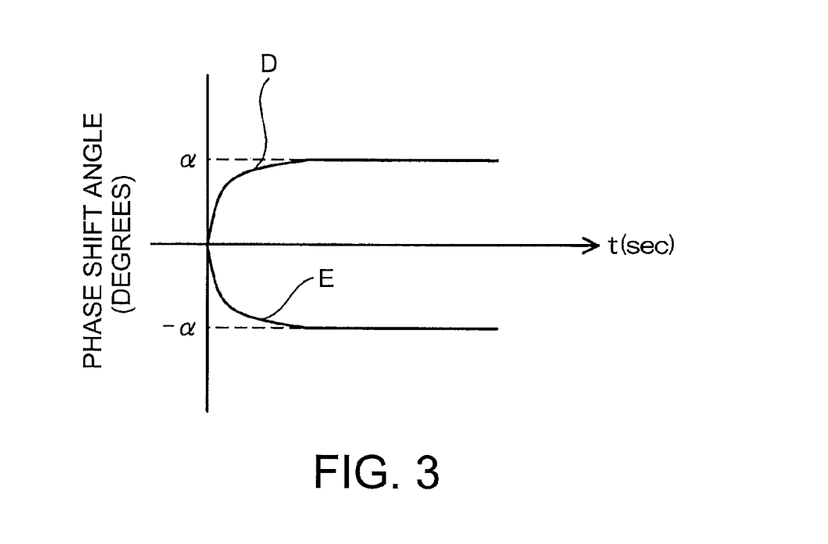
FIG. 3 is a graph exhibiting a transition of a phase shift angle of a phase-shift circuit unit according to one embodiment of the invention.

The phase shift angle changes in proportion to time, when the acceleration is applied and the phase shift angle starts to change. Thus, during this time, a value dθ/dt, given by the differentiation of the phase shift angle with respect to time, corresponds to the frequency change Δf of the input signal as well as to the change of the resonant frequency. Moreover, the frequency change Δf corresponds to the magnitude of acceleration as described above. Thus, the value dθ/dt also corresponds to acceleration. Consequently, the phase shift angle Δθ corresponds to a value given by the integral of the acceleration with respect to time.

The acceleration prior to the saturation of the phase shift angle is obtained using the value dθ/dt given by the differentiation of the phase shift angle with respect to time.

The waveform-shaping unit 28 arranged at the output side of the phase-shift circuit unit 22 shapes the waveform of the output signal of the phase-shift circuit unit 22, and outputs a square wave. The square wave output from the waveform-shaping unit 28 is input into a multiplier 46, together with the square wave output from the waveform-shaping unit 18. In this embodiment, the multiplier 46 is configured with an exclusive OR circuit, in other words, with an exclusive OR (Ex. OR) gate. Therefore, if any one of the output signal of the waveform-shaping unit 18 and waveform-shaping unit 28 is "1" and the other is "0", then the multiplier 46 outputs "1". A phase shift modification output unit 45 arranged at the output side of the multiplier 46 includes a low-pass filter (integration circuit) 48 and a differentiation circuit 49. The low-pass filter 48 outputs the average of the output signals from the multiplier 46. The differentiation circuit 49 receives the output of the low-pass filter 48, and outputs the differentiation thereof, so as to output a change in the values output by the low-pass filter 48. The coupling sequence of the low-pass filter 48 and the differentiation circuit 49 may be altered, so that the output from the multiplier 46 is input into a differentiation circuit and the output therefrom is input into a low-pass filter.

Figure 5A:
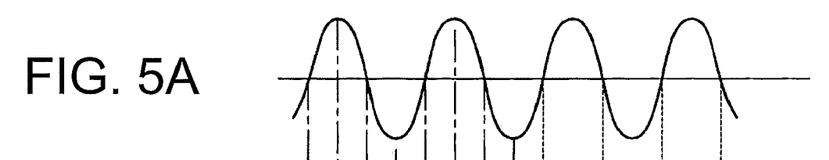
FIG. 5 is a timing chart describing an operation of an acceleration sensor according to one embodiment of the invention.
Figure 5B:
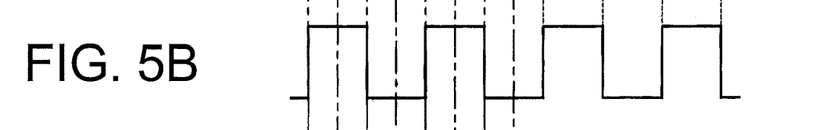

The operation of the acceleration sensor 10 configured as above in this embodiment is described as follows. In the stable state where the acceleration is not applied to the acceleration sensor device 30, the oscillation circuit 14 drives the first piezoelectric vibrating reed 16 of the oscillation unit 12, at the resonant frequency f0. Therefore, the oscillation unit 12 outputs signals of the frequency f0 shown in FIG. 5A. The signals output from the oscillation unit 12 are input into the waveform-shaping unit 18, and are shaped into the square wave shown in FIG. 5B by the waveform-shaping unit 18, thereafter input into the multiplier 46.

Figure 5C:
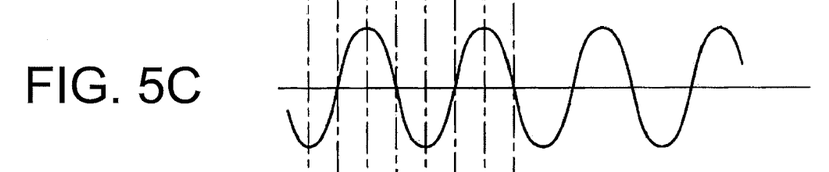

Some output signals of the oscillation unit 12 are split and input into a 90° phase shifting unit 20. For instance, as shown in FIG. 5C, the 90° phase shifting unit 20 delays the phase of the output signal from the oscillation unit 12 by 90° and outputs the result to the phase-shift circuit unit 22.

Figure 5D:
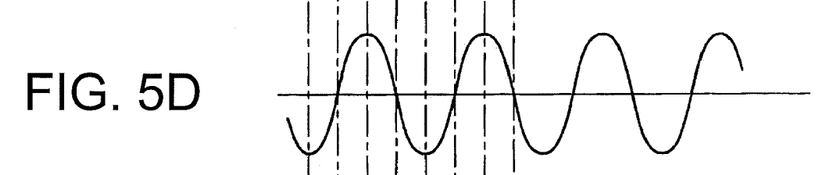

In the stable state where the acceleration is not applied to the acceleration sensor device 30, the resonant frequency of the second piezoelectric vibrating reed 24 in the phase-shift circuit unit 22 is the same as that of the resonant frequency f0 of the first piezoelectric vibrating reed 16 in the oscillation unit 12. Therefore, the frequency-phase shift characteristic in the phase-shift circuit unit 22 is expressed by the curve A. Here, the frequency of the output signal of the 90° phase shifting unit 20 is f0. Therefore, the oscillation unit 22 outputs the received signal as is, without changing the phase thereof, as shown in FIG. 5D. A waveform-shaping unit 28 receives the output signals of the oscillation unit 22. The waveform-shaping unit 28 shapes the output signals of the phase-shift circuit unit 22 and inputs the square wave indicated in a solid line in FIG. 5E into the multiplier 46.

Figure 5E:
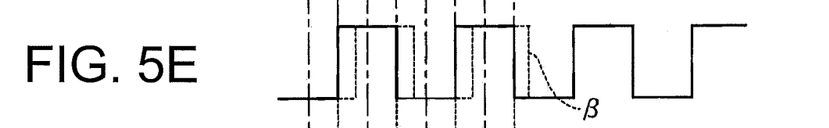
Figure 5F:
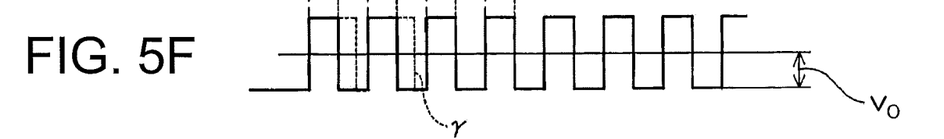

The multiplier 46 is, as described, configured with the Ex. OR, and obtains exclusive disjunction of the square wave output from the waveform-shaping unit 18 and the square wave output from the waveform-shaping unit 28. A result of the exclusive disjunction of the square wave indicated in FIG. 5B and the solid-line square wave indicated in FIG. 5E is indicated in a solid line in FIG. 5F, the result represented as a signal output from the multiplier 46. The square wave signal indicated in a solid line in FIG. 5F is input into the low-pass filter 48. The low-pass filter 48 receives the square signal and outputs the integral of the square signals over time. If the acceleration is not applied to the acceleration sensor device 30, the duty ratio of the square wave signal (square wave pulse) output from the multiplier 46 is 50%. Therefore, the low-pass filter 48 outputs the average of values indicated as the solid-line square wave signal in FIG. 5F. For instance, if the value of the output pulse of the multiplier 46 shown in FIG. 5F is "0", the voltage is 0V, and if the value is "1", the voltage is 5V. Here, the low-pass filter 48 outputs the average voltage v0=2.5V when the acceleration is not applied.

Thereafter, if the acceleration sensor device 30 is accelerated in the direction of the arrow 44 in FIG. 4, then the tensile stress works in the vibrating arms 36a and 36b of the first piezoelectric vibrating reed 16 in the oscillation unit 12, changing the resonant frequency of the reed from f0 to f0+Δf. At the same time, the compressive stress works in the vibrating arms 40 in the second piezoelectric vibrating reed 24 of the phase-shift circuit unit 22, changing the resonant frequency of the reed from f0 to f0−Δf. Therefore, the frequency-phase shift characteristic of the phase-shift circuit unit 22 is expressed by the curve B in FIG. 2. Here, if the phase-shift circuit unit 22 receives the signal with the frequency of f0+Δf from the 90° phase shifting unit 20, the phase of the output signal is delayed compared to that of the input signal, and the phase shift angle stabilizes after reaching −α as indicated in FIG. 3. The waveform-shaping unit 28 that shapes the output signals of the phase-shift circuit unit 22 outputs a square wave indicated in a dotted line β in FIG. 5E. As a result, the multiplier 46 which receives the square waves output from the waveform-shaping units 18 and 28 inputs a square wave signal (square pulse) γ into the low-pass filter 48. Here, the duty ratio of the square wave is larger than 50%, as indicated in a dotted line in FIG. 5F. The low-pass filter 48 obtains the average of the square wave signal Y input thereto, and outputs a voltage signal larger than V0. In other words, the low-pass filter 48 outputs a signal corresponding to the shift length of the signal the phase-shift circuit unit 22 outputs, the shift length deviated from the 90° phase difference. If the acceleration sensor device 30 is accelerated in the direction of the arrow 47, i.e. in the direction opposite to the arrow 44, then the multiplier 46 outputs a square pulse that has the duty ratio smaller than 50%. Consequently, the low-pass filter 48 outputs a voltage signal the value thereof being smaller than V0.

The differentiation circuit 49 receives a voltage output from the low-pass filter 48, and outputs a value given by the differentiation of the voltage with respect to time. In other words, The differentiation circuit 49 outputs a change in values corresponding to the shift length of the signal the phase-shift circuit unit 22 outputs, the shift length deviated from the 90° phase difference. When the phase shift angle starts to change, the deviation of the shift length corresponds to acceleration. Therefore, the magnitude of acceleration is calculated with the output of the differentiation circuit 49.

This above-described embodiment is one of the embodiments according to one aspect of the invention, and the embodiments are not limited thereto. For instance, in the above embodiment, the first piezoelectric vibrating reed 16 and the second piezoelectric vibrating reed 24 are tuning fork piezoelectric vibrating reeds. However, double-ended tuning fork piezoelectric vibrating reeds may also be used, which increases the sensitivity and precision of an acceleration sensor. Moreover, in the above embodiment, the first piezoelectric vibrating reed 16 and the second piezoelectric vibrating reed 24 are accommodated in the same package. However, they may also be accommodated in different packages. Further, in the above embodiment, the first piezoelectric vibrating reed 16 and the second piezoelectric vibrating reed 24 are arranged on the same surface. However, they may also be arranged one on top of the other. Still further, the acceleration sensor may also include a detector circuit accommodated inside the package 32, together with the piezoelectric vibrating reeds 16 and 24.

When the acceleration sensor 10 according to the above embodiment is not accelerated, the resonant frequency of the second piezoelectric vibrating reed 24 is set to be equal to the frequency of the first piezoelectric vibrating reed 16. In other words, the resonant frequency f0 of the second piezoelectric vibrating reed 24 in the non-acceleration state is the same as the resonant frequency of the first piezoelectric vibrating reed 16. Consequently, the environmental temperature change causes, for instance, the frequency increase, i.e., generation of a higher frequency, of the first piezoelectric vibrating reed 16 included in the oscillation circuit 14, increasing the frequency of the signal output from the oscillation circuit 14.

At the same time, in the phase-shift circuit unit 22, the environmental temperature change causes a shifting in an attenuation-frequency characteristic, where the attenuation is expressed by an input/output ratio, in the direction the magnitude of attenuation declines. Here, the graphical form of the characteristics remains the same, as illustrated in FIG. 7, where the pre-shifting characteristic is indicated in a solid line and the post-shifting characteristic is indicated in a dotted line.

Figure 7:
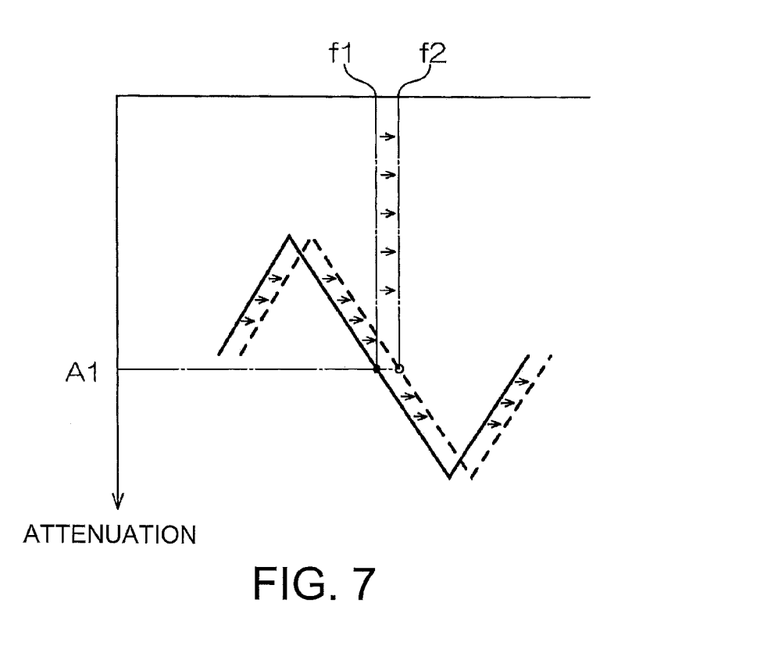
FIG. 7 is a graph exhibiting attenuation-frequency characteristics of the acceleration sensor.

As shown in FIG. 7, the signal of the frequency f2 is input into the phase-shift circuit unit 22 from the oscillation circuit 14, the phase-shift circuit unit 22 having the attenuation-frequency characteristic indicated in the dotted line in FIG. 7. Therefore, the attenuation remains at A1, negating the change of attenuation, and thus the amplitude of the signal output from the phase-shift circuit unit 22 does not change.

The acceleration sensor 10 according to the above embodiment is used including the piezoelectric vibrating reeds 16 and 24 that have the same resonant frequency, both of them provided with the same temperature environment. Therefore, the frequency-temperature characteristic changes in the same manner, preventing, when the acceleration is not applied, the detection of an inaccurate value different from the correct acceleration signal caused by the temperature change.

Other embodiments of the acceleration sensor 10 shown in FIG. 1 will now be described in detail. The acceleration sensor 10 includes a package accommodating a first tuning fork piezoelectric vibrating reed and an integrated circuit which together forms an oscillation circuit, and a second tuning fork piezoelectric vibrating reed included in a phase-shift circuit unit (filter circuit); and a lid that seals the package in an air tight manner.

SECOND EMBODIMENT

According to a second embodiment, a package is formed having two cavities stacked one on top of the other, including a interconnection substrate 330 therebetween, the interconnection substrate 330 being shared by conductive patterns formed on both sides of the substrate. One cavity accommodates a first and a second tuning fork piezoelectric vibrating reeds, and the other cavity accommodates the integrated circuit.

Figure 8:
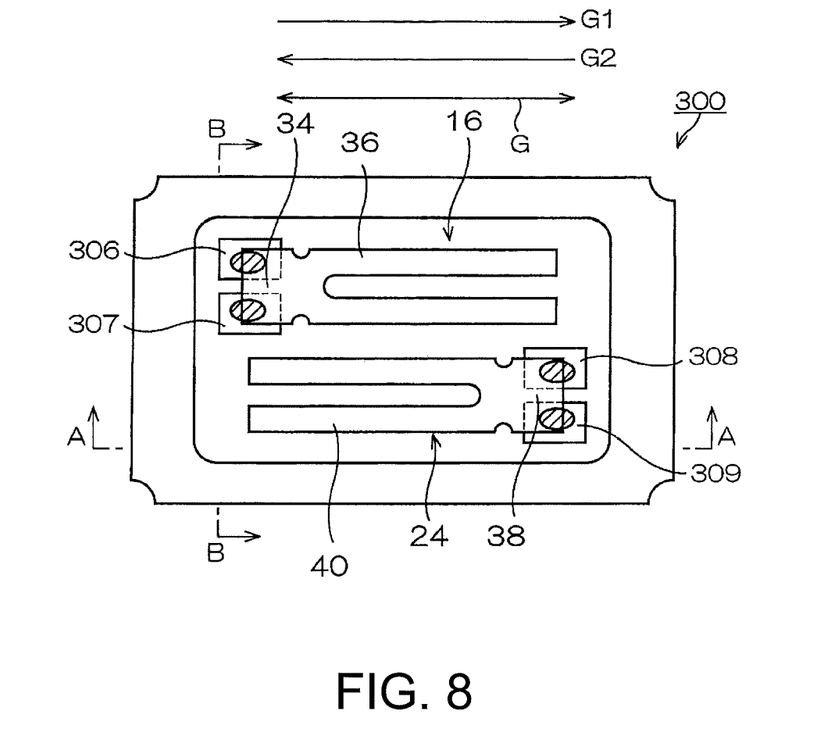
FIG. 8 is a top view illustrating a piezoelectric device according to one embodiment of the acceleration sensor according to one aspect of the invention.
Figure 9:
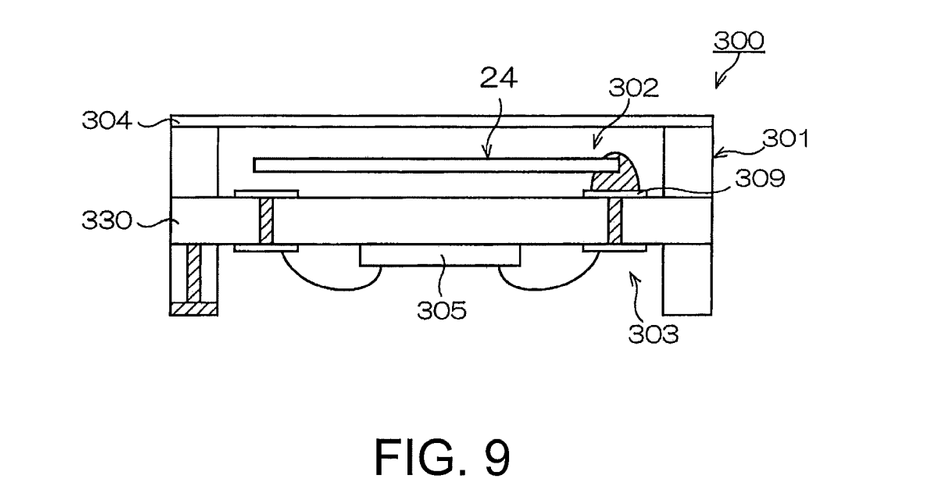
FIG. 9 is a cross-sectional view along a line A-A in FIG. 8.
Figure 10:
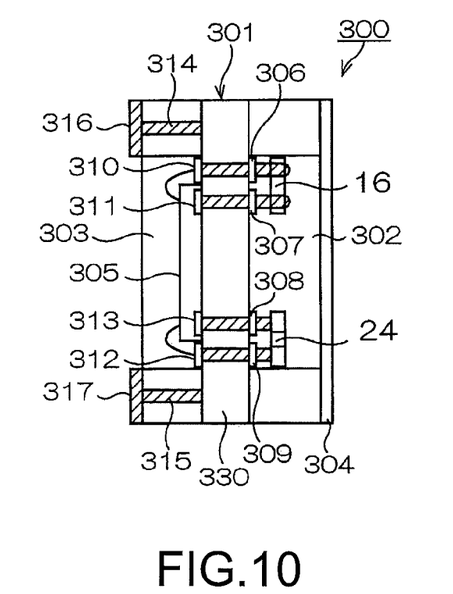
FIG. 10 is a longitudinal sectional view along a line B-B in FIG. 8.

Piezoelectric device 300 illustrated in FIGS. 8 to 10 constitutes an acceleration sensor. The piezoelectric device 300 accommodates the first piezoelectric vibrating reed 16 of the oscillation circuit 14 and the second piezoelectric vibrating reed 24 of the phase-shift circuit unit 22 in a single package.

FIG. 8 is a top view of the piezoelectric device 300. FIG. 9 is a schematic cross-sectional view along the line A-A in FIG. 8, and FIG. 10 is a longitudinal sectional view along the line B-B in FIG. 8.

Referring to FIGS. 8 to 10, the first piezoelectric vibrating reed 16 and the second piezoelectric vibrating reed 24 are mounted in one of the cavity 302 of an H-shaped package 301, and are sealed with a lid 304 in an air tight manner. For the convenience of description, the lid 304 is not illustrated in the top view in FIG. 8. An IC chip 305 is installed in the other cavity 303 of the H-shaped package 301.

The package 301 is formed, for instance, by laminating and thereafter sintering a plurality of substrate layers formed by molding a ceramic green sheet composed with aluminum oxide as an insulating material. The lid 304 is formed with materials selected from ceramics, metals, and glass. The metal material generally provides the lid 304 with the higher strength compared to other materials. Materials that have thermal expansion coefficients that are proximate to that of the package 301, such as kover, are suitable for the lid 304. Moreover, the lid 304 is formed with optically transparent materials such as glass, so as to enable a frequency adjustment after sealing the package. A plate formed with borosilicate glass, for instance, may be used for the lid 304.

Electrode units 306, 307, 308, and 309 are installed on the sides of the cavity 302 of the package 301, those electrode units being formed with, for instance, nickel plate or gold dore, deposited on tungsten metallized surface. The electrode units 306, 307, 308, and 309 are respectively coupled with electrodes 310, 311, 312, and 313 formed on the cavity 303 of the package 301. These electrodes 310, 311, 312, and 313 are connected to the terminals of the IC chip 305 with a wire bonding. The IC chip 305 is coupled with mounting terminals 316 and 317 via through holes 314 and 315 provided in the package 301.

A conductive adhesive is coated on the electrode units 306, 307, 308, and 309 installed in the cavity 302 of the package 301. The base 34 of the first piezoelectric vibrating reed 16 and the base 38 of the second piezoelectric vibrating reed 24 are placed on this conductive adhesive, which is to be hardened. The conductive adhesive may include synthetic resin, which is an adhesive constituent that exhibits bonding power. The synthetic resin may contain conductive particles such as fine silver particles. Examples of such conductive adhesive include silicones, epoxies, and polyimides. Epoxy conductive adhesive is suitable in order to rigidly adhere and fix the anchors of the tuning fork piezoelectric vibrating reeds.

The first piezoelectric vibrating reed 16 and the second piezoelectric vibrating reed 24 correspond to the configuration in FIG. 1 used as an oscillation circuit and a phase-shift circuit unit (filter circuit).

Such first piezoelectric vibrating reed 16 and the second piezoelectric vibrating reed 24 include: the bases 34 and 38 formed with piezoelectric material formed in a shape of, for instance, a rectangular or a square; and a pair of vibrating arms 36 (36a and 36b) extending from the base 34 and a pair of vibrating arms 40 (40a and 40b) extending from the base 38.

Electrodes are formed, for instance, on the principal surfaces, in other words, on the top-side and the back-side surfaces of the vibrating arms 36 and 40 of the first and the second piezoelectric vibrating reeds 16 and 24. These electrodes are coupled with extraction electrodes of the bases 34 and 38.

A driving voltage impressed to these extraction electrodes causes flexion movements in a way that the two front edges of the vibrating arms 36 and 40 are pulled toward or away from each other.

As described, the first piezoelectric vibrating reed 16 and the second piezoelectric vibrating reed 24 are arranged so that their vibrating arms 36 and 40 extend in parallel with the vector of acceleration G to be detected.

According to the piezoelectric device 300 in the second embodiment described above, the first piezoelectric vibrating reed 16 of the oscillation circuit 14 and the second piezoelectric vibrating reed 24 of the phase-shift circuit unit (filter circuit) 22 are accommodated in a single package, providing a smaller acceleration sensor.

Moreover, the thickness of the entire apparatus is reduced by installing the interconnection substrate 330 that are shared by the electric components accommodated in the two cavities 302 and 303, providing a thinner apparatus.

THIRD EMBODIMENT

According to a third embodiment, a package is formed having two cavities stacked one on top of the other, the cavities including interconnection substrates 431 and 432. One cavity accommodates a first and a second tuning fork piezoelectric vibrating reeds, and the other cavity accommodates the integrated circuit.

Figure 11:
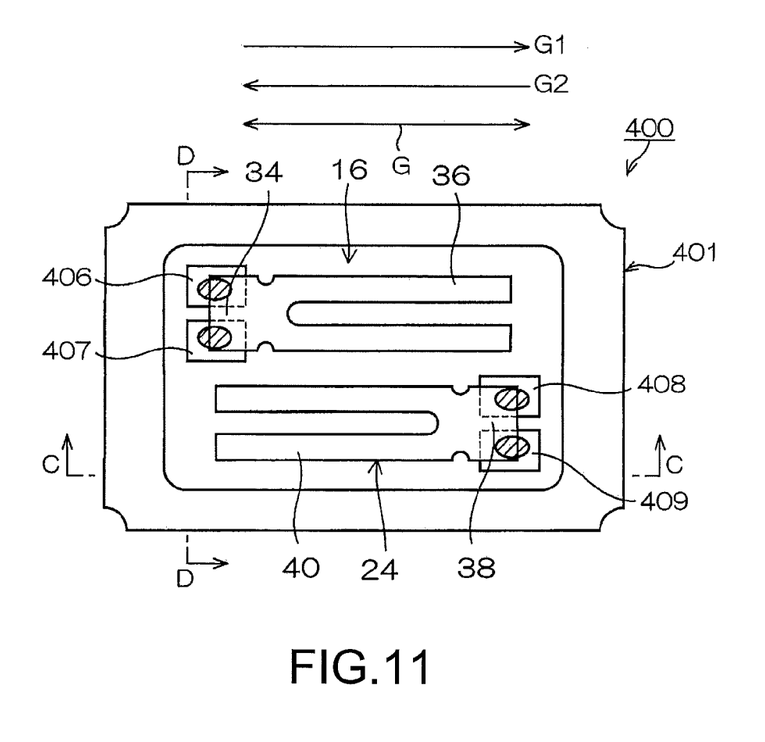
FIG. 11 is a top view illustrating a piezoelectric device according to another embodiment of the acceleration sensor according to one aspect of the invention.
Figure 12:
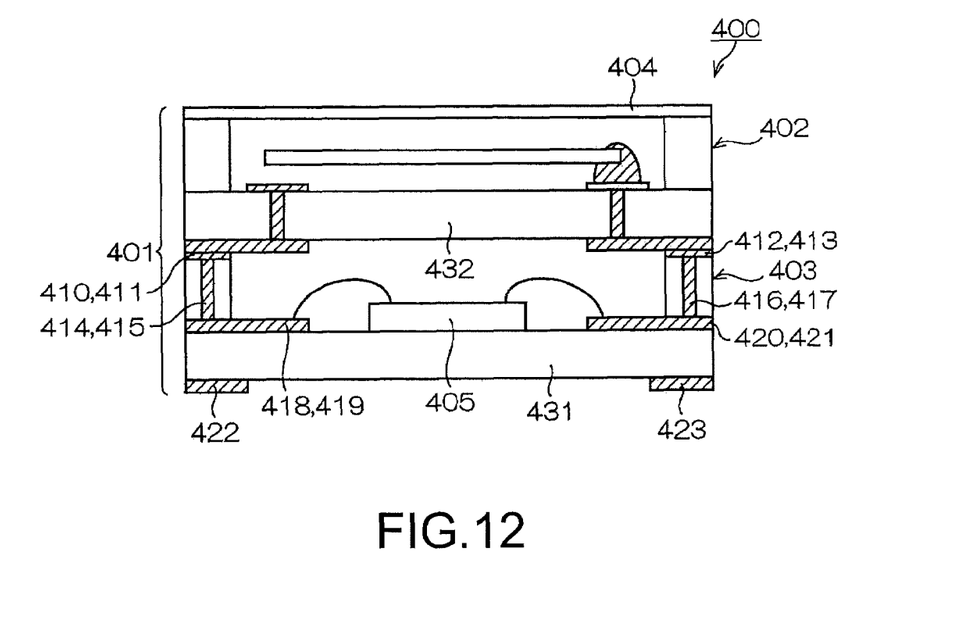
FIG. 12 is a cross-sectional view along a line C-C in FIG. 11.
Figure 13:
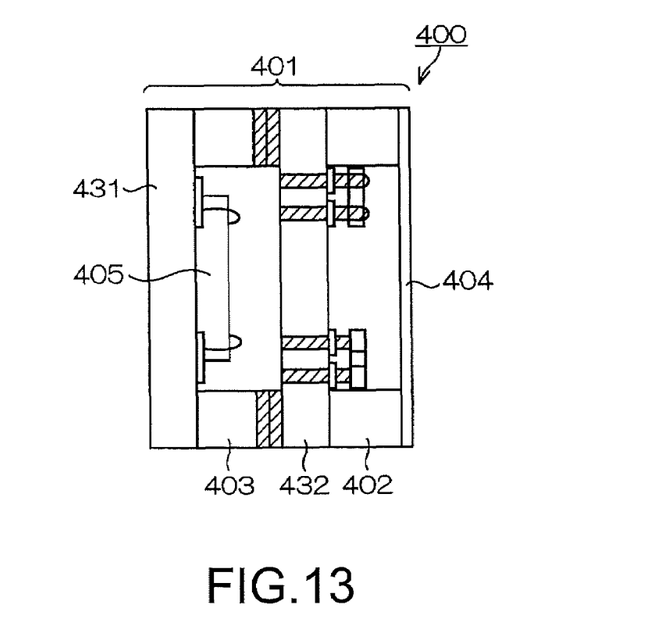
FIG. 13 is a longitudinal sectional view along a line D-D in FIG. 11.

As shown in FIGS. 11 to 13, a piezoelectric device 400 constitutes an acceleration sensor. The piezoelectric device 400 accommodates the first piezoelectric vibrating reed 16 of the oscillation circuit 14 and the second piezoelectric vibrating reed 24 of the phase-shift circuit unit (filter circuit) 22 in a single package.

FIG. 11 is a top view of the piezoelectric device 400. FIG. 12 is a schematic cross-sectional view along the line C-C in FIG. 11, and FIG. 13 is a longitudinal sectional view along the line D-D in FIG. 11.

Referring to an example shown in FIGS. 11 to 13, the first piezoelectric vibrating reed 16 and the second piezoelectric vibrating reed 24 are mounted in an upper cavity 402 of the package 401, and are sealed with a lid 404 in an air tight manner. For the convenience of description, the lid 404 is not illustrated in the top view in FIG. 11. An IC chip 405 is installed in a lower cavity 403 of the package 401.

The package 401 differs from the package 301 in the second embodiment, only in that two interconnection substrates 431 and 432 are used in forming the two cavities 402 and 403. The material and the forming method are the same as that of the second embodiment. Therefore, the description overlapping therewith is omitted.

Electrode units 406, 407, 408, and 409 are installed on the sides of the interconnection substrate 432 that defines the upper cavity 402 of the package 401, those electrode units being formed with, for instance, nickel plate or gold dore, deposited on tungsten metallized surface.

The electrode units 406, 407, 408, and 409 are respectively coupled with electrodes 410, 411, 412, and 413 formed above the interconnection substrate 431 that defines the lower cavity 403 of the package 401. These electrodes 410, 411, 412, and 413 are coupled with electrodes 418, 419, 420, and 421 via through holes 414, 415, 416, and 417. The electrodes 418, 419, 420, and 421 are connected to the IC chip 405 with a wire bonding. The electrodes 418, 419, 420, and 421 are coupled with mounting terminals 422 and 423 via un-illustrated conductive through holes.

A conductive adhesive is coated on the electrode units 406, 407, 408, and 409 installed in the upper cavity 402 of the package 401. The base 34 of the first piezoelectric vibrating reed 16 and the base 38 of the second piezoelectric vibrating reed 24 are placed on this conductive adhesive, which is to be hardened.

The rest of the structure is the same as that of the second embodiment.

According to the piezoelectric device 400 of the third embodiment described above, the first piezoelectric vibrating reed 16 of the oscillation circuit 14 and the second piezoelectric vibrating reed 24 of the phase-shift circuit unit (filter circuit) 22 are accommodated in a single package, providing a smaller acceleration sensor.

The invention shall not be limited to the above-mentioned embodiments. Structures in those embodiments may be appropriately combined with one another, or, combined with other un-illustrated structures that are omitted for explanation.

Moreover, the invention may be applied without the package, as long as a tuning fork piezoelectric vibrating reed is utilized. In the above-referenced embodiments, the box-shaped package with a lid formed with ceramics is utilized for the tuning fork piezoelectric vibrating reed. However, the embodiment of the package is limited thereto, and may also include a housing container in which the tuning fork piezoelectric vibrating reed is adhered to a plane substrate, and is sealed by a lid with a cap structure.

What is claimed is:

1. A vibration acceleration sensor, comprising:
    an oscillator unit for outputting an oscillator signal, the oscillator unit including:
        a first piezoelectric vibrating reed having a vibrating arm that performs bending vibration; and
        an oscillator circuit for oscillating the first piezoelectric vibrating reed;
    a phase shifting unit for shifting and outputting a given phase angle of an output signal of the oscillator unit;
    a phase shift circuit unit provided with a second piezoelectric vibrating reed having a vibrating arm that performs bending vibration, arranged at an output side of the phase shifting unit;

a multiplier for multiplying an output signal of the phase shift circuit unit by the output signal of the oscillator circuit; and a phase shift modification output unit which receives an output from the multiplier and outputs a value corresponding to a change in a phase shift angle of an input-output signal of the phase shift circuit unit;

a resonant frequency of the second piezoelectric vibrating reed being equal to a frequency of the output signal of the oscillator unit, in a state where no acceleration is applied.

2. The vibration acceleration sensor according to claim 1, wherein the first piezoelectric vibrating reed and the second piezoelectric vibrating reed are arranged so that an axis direction of the vibrating arm of the first piezoelectric vibrating reed and an axis direction of the vibrating arm of the second piezoelectric vibrating reed are opposite from each other.

3. The vibration acceleration sensor according to claim 1, wherein a frequency-phase shift characteristic of the phase shift circuit unit is point symmetric with respect to the resonant frequency of the second piezoelectric vibrating reed without acceleration.

4. The vibration acceleration sensor according to claim 1, wherein the first piezoelectric vibrating reed and the second piezoelectric vibrating reed are tuning fork vibrating reeds formed with a piezoelectric material.

5. The vibration acceleration sensor according to claim 1, wherein the first piezoelectric vibrating reed and the second piezoelectric vibrating reed are double-ended tuning fork vibrating reeds formed with a piezoelectric material.

6. The vibration acceleration sensor according to claim 1, further comprising:

a package accommodating the first piezoelectric vibrating reed and an integrated circuit, both forming the oscillator circuit, and the second piezoelectric vibrating reed included in a phase-shift circuit unit; and a lid sealing the package in an air tight manner.

7. The vibration acceleration sensor according to claim 6, wherein the package is formed having two cavities stacked one on top of the other, each cavity including an interconnection substrate, one cavity accommodating the first and the second piezoelectric vibrating reeds, and the other cavity accommodating the integrated circuit.

8. The vibration acceleration sensor according to claim 6, wherein the package is formed having two cavities stacked one on top of the other, having a shared interconnection substrate therebetween, one cavity accommodating the first and the second piezoelectric vibrating reeds, and the other cavity accommodating the integrated circuit.

* * * * *